United States Patent [19]

Gould et al.

[11] Patent Number: 4,774,098

[45] Date of Patent: Sep. 27, 1988

[54] MODIFIED PLANT FIBER ADDITIVE FOR FOOD FORMULATIONS

[75] Inventors: John M. Gould, Brimfield; Lee B. Dexter, Princeville, both of Ill.

[73] Assignee: The United States of America as represented by the Secretary of Agriculture, Washington, D.C.

[21] Appl. No.: 80,190

[22] Filed: Jul. 31, 1987

Related U.S. Application Data

[63] Continuation of Ser. No. 809,803, Dec. 16, 1985, abandoned.

[51] Int. Cl.$^4$ ............................................. A23K 1/00
[52] U.S. Cl. ................................ 426/549; 426/573; 426/622; 426/635; 426/807
[58] Field of Search ............... 426/549, 573, 622, 635, 426/807

[56] References Cited

U.S. PATENT DOCUMENTS

| | | | |
|---|---|---|---|
| 1,251,614 | 1/1918 | Anders | 162/78 |
| 1,811,864 | 6/1931 | Richter | 162/78 |
| 2,487,114 | 11/1949 | Dreyfus | 162/78 |
| 3,023,104 | 2/1962 | Battista | 426/804 X |
| 3,676,150 | 7/1972 | Glicksman et al. | 426/804 X |
| 4,109,018 | 8/1978 | Thompson | 426/804 X |
| 4,237,170 | 12/1980 | Satin | 426/21 |
| 4,241,093 | 12/1980 | Farag et al. | 426/258 |
| 4,307,121 | 12/1981 | Thompson | 426/431 |
| 4,401,682 | 8/1983 | Battista | 426/285 |
| 4,431,681 | 2/1984 | Hegedus et al. | 426/553 |
| 4,451,490 | 5/1984 | Silverman et al. | 426/804 X |
| 4,517,204 | 5/1985 | Mottur et al. | 426/94 |
| 4,590,076 | 5/1986 | Titcomb et al. | 426/62 |
| 4,649,113 | 3/1987 | Gould | 435/165 |

OTHER PUBLICATIONS

CRC Handbook of Chemistry and Physics, Robert C. Weast, ed., 54th Edition, pp. B-77, D-130.

Albert L. Lehninger, Biochemistry, Second Edition, The Molecular Basis of Cell Structure and Function, Chapter 2, pp. 45-50.

*Primary Examiner*—R. B. Penland
*Attorney, Agent, or Firm*—M. Howard Silverstein; David G. McConnell; Curtis P. Ribando

[57] ABSTRACT

Food compositions are prepared incorporating an alkaline peroxide-treated conversion product of a non-woody, lignocellulosic substrate. In a ruminant system, the conversion product serves as a highly digestible carbohydrate source. When added to foods intended for consumption by humans and monogastric animals, the conversion product functions as a natural source of dietary fiber and a noncaloric substitute for cereal flour or other amylaceous materials. It is also useful as an extender and promoter of functional properties in doughs and batters.

30 Claims, No Drawings

MODIFIED PLANT FIBER ADDITIVE FOR FOOD FORMULATIONS

This application is a continuation of application Ser. No. 06/809,803, filed Dec. 16, 1985, abandoned.

BACKGROUND OF THE INVENTION

1. Field of the Invention

Dietary fiber can be defined as including all the insoluble and soluble components of food that are not broken down by digestive tract enzymes to produce low molecular weight compounds that can be readily absorbed into the blood stream. Plant cell wall materials such as cellulose, hemicellulose, lignin, and pectins are the primary source of dietary fiber in human and many animal diets, along with gums, mucilages, and other carbohydrates. The maintenance of adequate levels of fiber is important for the proper health and function of the body. Low levels of dietary fiber are associated with increased risk of colo-rectal cancers, inefficient and irregular bowel function, and other digestive disorders. Diets high in fiber have been found to be useful in obesity control and weight reduction programs because of their high ratio of bulk to calories. For these reasons, the food and feed industries have turned to dietary fillers and bulking agents for supplying the fiber requirements demanded by the market.

2. Description of the Prior Art

Dietary fillers and bulking agents can be categorized by solubility. The soluble group includes primarily the gums, pectins, and mucilages. These materials can have a substantial effect on the functional properties of other food components, and therefore have limited application in many food formulations. The insoluble fillers which have played a major role in this field include alphacellulose and microcrystalline cellulose. Alphacellulose is produced by grinding ordinary, kraft paper pulp obtained by the sulfiting of hardwood. Consumer acceptability of this product has been limited to some extent by its objectionable texture and mouth feel. The cellulose chains of kraft pulp comprise both crystalline and amorphous regions. When treated with hydrochloric acid as described by Battista et al. in U.S. Pat. No. 3,023,104, the amorphous regions are hydrolyzed leaving particles of crystallite aggregates, otherwise known as microcrystalline cellulose. Thompson et al. (U.S. Pat. No. 4,307,121) discloses a method for converting relatively nonligneous cellulose material such as soybean hulls to a short fiber cellulose suitable for human consumption. The process involves heating these materials in a slurry with a strong oxidizing reagent such as chlorine gas, followed by an alkaline cook, to yield a purified cellulose product.

The desirability of reducing the caloric content of certain foods while simultaneously increasing their content of dietary fiber has led to the development of food formulations where calorie-dense components such as flour are replaced partially by low-calorie fillers or bulking agents, either alone or in combination with various gums. These formulations have for the most part been utilized in baked goods such as breads and cakes. For example, in U.S. Pat. No. 3,676,150, Glicksman et al. teaches the production of a yeast-leavened bread from a wheat flour substitute comprising by weight 1-10% of a cellulose gum, 30-70% starch, and 30-70% alphacellulose.

In U.S. Pat. No. 4,237,170, Satin shows the preparation of a high-fiber content white bread wherein pea hulls ground to a small particle size are substituted for 5 to 20 parts by weight of the wheat flour.

Glicksman, U.S. Pat. No. 4,503,083, teaches the preparation of a reduced-calorie cake from a composition containing up to 10% of a bulking agent consisting of citrus albedo, sugarbeet pulp, and/or pineapple core, alone or in combination with a variety of gums such as carrageenan, guar, gum arabic, locust bean gum, tragacanth, karaya, hydroxypropylcellulose, methylcellulose, carboxymethylcellulose, xanthan, pectin, alginate, and agar.

Breads are made from a yeast-leavened, wheat flour dough which relies heavily upon the continuity of a gluten network for its elastic properties. In the making of a low-calorie bread, fillers added to the dough must not interfere with either the gluten network or the activity of the yeast.

Cakes differ from breads in that they are formed from batters which are foamed by mechanical agitation (mixing) or chemical leavening systems. In adding a fibrous filler to the batter, the rheological properties must be maintained in order to preserve the foam structure responsible for the texture of the baked product.

Fillers have also been incorporated as the principal ingredient in liquid and solid formulations designed as low-calorie meals. These preparations typically contain caloric constituents only as required to augment the flavor and overall consumer acceptability.

SUMMARY OF THE INVENTION

We have now discovered that food compositions can be extended and uniquely modified by the addition of a modified plant fiber (MPF); namely, an alkaline peroxide-treated conversion product of a nonwoody, lignocellulosic substrate. As an additive to compositions intended for consumption by humans or other monogastrics, the MPF functions as a noncaloric fiber source. When it is substituted for a portion of a starch-containing component in a food formulation, the functional properties imparted by the starch-containing component at its original level are retained or enhanced. For example, the bread-forming properties of a wheat flour dough are improved when up to 30% by weight or 60-70% by volume of the flour has been replaced by the MPF.

In accordance with this discovery, it is an object of the invention to provide a novel source of natural, dietary fiber for incorporation into ingestible formulations.

Another object of the invention is to extend food compositions with a natural source of dietary fiber.

It is also an object of the invention to prepare reduced-calorie food products for consumption by humans and other monogastrics.

An additional object of the invention is to incorporate the MPF conversion product of the invention as a carbohydrate source in a ruminant feed formulation.

Another object of the invention is to employ MPF as a noncaloric substitute for cereal flour or other starch-containing materials in formulated food compositions.

A further object of the invention is to provide a food additive for enhancing the functional properties of flour in doughs, batters, and other food products.

Other objects and advantages of this invention will become readily apparent from the ensuing description.

DETAILED DESCRIPTION OF THE INVENTION

The MPF for use in this invention can be prepared by either of two variations of a method described in application Ser. No. 06/566,380 of John Michael Gould filed on Dec. 28, 1983, now U.S. Pat. No. 4,649,113 and entitled "Alkaline Peroxide Treatment of Nonwoody Lignocellulosics." These variations are detailed below.

The term "available" and its derivatives as used herein in reference to the terms "cellulose," "hemicellulose," and "polysaccharides" are defined as meaning "free" in the sense that these components of the substrate are accessible for direct chemical, biochemical, or microbial attack. For example, these carbohydrates would be accessible for enzymatic hydrolysis to monosaccharides under normal conditions, and/or readily digestible by ruminant animals without prior modification. The term "woody" is used herein both in the botanical sense to mean "comprising wood;" that is, composed of extensive xylem tissue as found in trees and shrubs, and also in the sense of "being woodlike."

Sources of lignocellulosic substrates which can be advantageously treated in order to produce the products useful in the invention include the leaves and stalks of nonwoody plants, particularly monocotyledonous plants, and especially grassy species belonging to the family Gramineae. Of primary interest are gramineous agricultural residues; that is, the portions of grain-bearing grassy plants which remain after harvesting the seed. Illustrative of such residues without limitation thereto are wheat straw, oat straw, rice straw, barley straw, rye straw, buckwheat straw, flax straw, corn stalks, corn cobs, corn husks, and the like. The process is also highly effective when applied to certain grasses not conventionally cultivated for agricultural purposes, such as prairie grasses, gamagrass, and foxtail. Due to the unique combination of chemical substructures characteristic of the natural lignins in monocots, near quantitative cellulose availability is achievable by virtue of the conversion process. In comparison, the amount of free cellulose enrichment is relatively limited when the process is applied to the tissues of many dicotyledons such as trees, shrubs, and leguminous plants. The woody dicots, therefore, are not considered to be suitable sources of substrate within the ambit of the invention.

The substrate may be treated directly in its field-harvested state or may optionally be subjected to one or more preparatory steps such as chopping or grinding to facilitate handling. In some cases, it may be necessary to clean the substrate by screening, washing, or the like in order to remove dirt, debris, and other undesirable matter.

The reaction is conducted in an aqueous medium in sufficient quantity to effect uniform wetting of the substrate. Typically, the substrate is suspended in the medium at concentrations ranging from about 20–500 g./l.

It is important that the initial pH of the resultant slurry be within the range of about 11.2 to about 11.8, and preferably as close to 11.5 as possible. Below pH 11.2, the delignification efficiency declines significantly. Above pH 11.8 delignification may be slightly improved, but the saccharification efficiency declines. Initial adjustment of the slurry pH to within the aforementioned range is readily accomplished by addition of sodium hydroxide or other strong alkali. Under some conditions, during the course of the reaction, the pH tends to drift upwards if not adjusted periodically by addition of acid. If the pH is allowed to drift beyond 11.8, the hemicellulose is solubilized and thereby readily separable from the insoluble cellulosic fraction. The MPF conversion product thereby obtained has been designated "Type I." On the other hand, by controlling the pH so as to maintain it within the 11.2–11.8 range throughout most of the reaction, the preponderance of the hemicellulose remains insolubilized with the cellulose. The yield of these two components in the insoluble fraction approaches the theoretical amount. Their availability as indicated by nearly quantitative cellulose-to-glucose enzymatic conversion efficiencies approaches 100%. The pH-controlled MPF conversion product has been designated "Type II."

The degree or efficiency of delignification attainable by the process for a given substrate is limited to an intrinsic maximum, and at least in part is a function of the concentration of $H_2O_2$ in the reaction medium. Generally, the peroxide should be present at a concentration in the aqueous medium of at least about 0.75–1%. The minimum amount of peroxide needed to achieve the maximum delignification can be readily determined by the skilled artisan.

The reaction of the alkaline peroxide with the lignocellulosic substrate proceeds at a relatively rapid rate at room temperature (25° C.), minimizing the requirement for energy input. Other temperatures within the range of 5° C. to at least 60° C. are also operable, with of course some variance in the rate of delignification. At optimum peroxide levels, pH 11.5, and 25° C., degradation of wheat straw is complete in 4–6 hr. Physical disintegration of the substrate is facilitated by application of mechanical shear such as that provided by a conventional stirring apparatus.

Upon completion of the reaction, the partially delignified insoluble fraction is recovered by filtration, washed with water, and optionally dried. The filtrate containing the solubilized lignin degradation products is suitable for recycle upon addition of makeup $H_2O_2$ and readjusting the pH as necessary. Typically about 40–60% of the original lignin content of the substrate is removed from the insoluble fraction and enters into the supernatant. The buildup of soluble lignin in continuously recycled medium has a negligible effect on the reagents' efficacy toward delignification.

As compared to the original substrate, the recovered residue exhibits a significant increase in water absorbency, suggesting a corresponding decrease in the proportion of total cellulose contained in highly crystalline structures and an increase in the amorphous structures. It was surprising to find that, contrary to other treatments as known in the art for reducing cellulose crystallinity, the alteration of the crystalline structure by the alkaline peroxide treatment is irreversible, such that the enhanced water absorbency persists even after drying. While not desiring to be bound to any particular theory of operation, the observed changes in the properties of the cellulose are thought to be the result of a modification of a small portion (<5%) of the glucose units such as to disrupt the hydrogen bonding pattern between chains, and thereby maintain a highly open structure.

We have found that the objectives of the invention are achieved by incorporating either the Type I or Type II MPF into a wide variety of ingestible formulations including human and animal food compositions. In one embodiment, the MPF may be incorporated as an additive in the sense that it does not alter the relative proportions of the remaining ingredients. In this respect, it serves as a diluent. Alternatively, it can be used as a substitute or extender for a singular component of the formulation, or as the principal ingredient in a dietary product.

The term "ingestible formulation" is meant to include any mixture of substances, which when eaten, will provide nutrition to the ingesting organism; or will otherwise have some desirable effect on the digestive system of the organism, as in satisfying the sensation of hunger. The terms "food," "food composition," and "food formulation" are used herein in their generic sense to encompass both nutritive human foods and animal feeds, as will occasionally be specified. The expression "dough flour" is synonymous with "dough-forming flour" and is intended to mean any flour which is useful in making a dough. Dough flours typically contain a sufficient level of gluten to impart the elasticity, tensile strength, and other properties characteristic of most doughs. The expression "bread flour" will of course refer to a dough flour useful in making bread. In similar fashion, "batter flour" is synonymous with "batter-forming flour" and is intended to refer to those flours useful in forming batters. Cake flour and pancake flour are exemplary of batter flours and will not normally have the comparatively high level of gluten found in dough flours. It is understood that the several types of flours mentioned above are not necessarily distinct from one another in terms of the cereal grain or tuber flour component, but that each specialty type of flour may comprise added ingredients which specifically suit it to its prospective use.

The MPF is remarkably adapted for use as a carbohydrate source in ruminant feeds without purification or further treatment. Up to 100% of the potentially digestible matter is in fact digestible by the ruminant animal. The product is suitably blended with other feed components needed for a balanced diet at any desired level of addition.

As previously mentioned, in ingestible formulations for humans and monogastric animals, the MPF functions as an inert, dietary fiber. Similar to the alphacelluloses and microcrystalline celluloses which are known in the prior art, the Type I and Type II materials are substantially non-nutritional in the sense that they are not sufficiently digested for assimilation into the blood stream. Toward this end, the level of addition is somewhat arbitrary and may be based upon knowledge in the art relating to the effects of dietary fiber on the digestive system. It is envisioned that food and other ingestible formulations amended in accordance with the invention without regard to functional properties may comprise from about 0.1 to about 95% of the MPF. Examples of such formulations include dispersible solids such as instant drink mixes, aqueous liquids such as milk shakes, and gels or gel formers.

When the MPF is used as a substitute or extender for an amylaceous component, namely, starch or flour, the maximum level of substitution will be determined by the extent of retentivity of the functional properties attributed to that component. We have surprisingly found that at levels of substitution up to about 65% by volume, the functional properties of the amylaceous component are not only retained, but in many cases enhanced as described in further detail below.

The bulk densities of both Type I and Type II MPF vary from about 10–30% of that of commercial wheat flour. When substituted for an equivalent weight of wheat flour, it therefore yields a formulated food having an enhanced volume. The MPF also has a high water absorptivity compared to wheat flour, resulting in an increased swollen volume. The effect is particularly evident in dough and batter formulations, wherein the volume quantities of the final products are extended substantially beyond what would be expected from a 1:1 weight basis substitution. This property allows doughs and batters to obtain the same consistency as those without the MPF, but at a lower solids content. The advantage of this effect resides in a savings of ingredients for a given product volume and weight.

Whereas dough and batter properties are devitalized when a portion of the wheat flour is replaced with alphacellulose, they are improved when replacement is with the MPF conversion products of this invention. For example, at 10% by weight MPF substitution for wheat flour in a dough preparation, mixograph peak height is increased by as much as 20%. By virtue of its high water absorptivity, the conversion product also facilitates assimilation of water into the dough, thereby decreasing mixing time.

The following examples are intended only to further illustrate the invention and are not intended to limit the scope of the invention which is defined by the claims.

EXAMPLE 1

MPF conversion products for use in accordance with the invention were prepared from several nonwoody lignocellulosic crop residues. Samples were prepared for treatment either by grinding in a Wiley mill to pass a 2 mm. screen or by chopping into segments approximately 2–4 cm. in length. For purposes of comparison, two woody substrates, ground kenaf and oak shavings, were similarly pretreated. Soluble materials were removed from the particulate samples by preextracting them with several changes of distilled water for a total of several hours, after which the residues were dried and stored in polyethylene containers.

The samples were treated with alkaline peroxide by placing 1 g. of the substrate to be treated in 50 ml. of distilled water containing 1% (w/v) $H_2O_2$. The suspension was adjusted to pH 11.5 with NaOH and allowed to stir gently at room temperature (25° C.) for 18–24 hr. No further adjustments in pH were made during the course of the reaction. Under these conditions, the reaction pH remained nearly constant for several hours before slowly rising to a final value of approximately 12.1. The insoluble residue was collected by filtration, washed with distilled water until the pH of the filtrate was neutral, and then dried at 110° C. A second set of samples was similarly treated except without the $H_2O_2$.

The susceptibility of lignocellulosic samples to digestion by cellulase was determined by incubating 0.2 g. dried residue in 4 ml. of a solution containing 50 mM citric acid, 0.1M $NaHPO_4$, 0.05% thymol, and 40 mg. *Trichoderma reesei* cellulase (pH 4.5) for 24 hr. at 45° C. Residual solids remaining after cellulase digestion were removed by centrifugation and millipore filtration before determination of the aqueous glucose concentration by high-performance liquid chromatography (HPLC).

Analysis of the cellulosic materials before and after alkaline treatment (with and without $H_2O_2$) indicated that none of the cellulose originally present in the material was solubilized during the pretreatment. The efficiency with which cellulase hydrolyzed the cellulose present in a given residue (saccharification efficiency) was calculated from the theoretically maximum glucose yield ($G_t$) and the measured glucose yield ($G_m$) according to the relationship:

$$\text{saccharification efficiency} = 100 \, (G_m/G_t).$$

The $G_t$ value for a given 0.2 g. sample was dependent upon the proportion of cellulose in the sample, which was determined by the amount of lignin and hemicellulose solubilized during the pretreatment. Because none of the cellulose was solubilized, $G_t$ was taken as $$G_t = [(0.2)(1.1)(C_0)]/R_i$$

where 0.2 is the weight of the sample being treated with cellulase, 1.1 is the weight conversion equivalent for cellulose into glucose, $C_0$ is the percent cellulose in the untreated (native) substrate, and $R_i$ is the percent of the original substrate that remained insoluble after the pretreatment.

The results are reported in Table I, below.

TABLE I

Saccharification Efficiency of Various MPF Conversion Products

| | | Saccharification efficiency (%) | |
|---|---|---|---|
| Example | Substrate | Without $H_2O_2$ | With $H_2O_2$ |
| | Nonwoody | | |
| 1A | Wheat straw | 27.2 | 93.0 |
| 1B | Wheat straw (intact) | 11.3 | 96.1 |
| 1C | Corn stalks | 49.8 | 100 |
| 1D | Corn cobs | 32.1 | 100 |
| 1E | Corn husks | 62.3 | 99 |
| 1F | Foxtail (intact) | 27.0 | 81.7 |
| 1G | Alfalfa hay | 40.9 | 93.6 |
| | Woody | | |
| 1H | Kenaf | 25.7 | 58.4 |
| 1I | Oak (shavings) | 21.8 | 52.5 |

EXAMPLE 2

Ground and washed wheat straw samples (1.0 g.) were suspended in 50 ml. water either with or without 1% w/v $H_2O_2$. The suspensions were adjusted to pH 11.5 with NaOH and stirred gently for either 6 or 24 hr. In the pH-controlled runs, the pH was held constant at 11.5 by addition of HCl or NaOH as necessary. The pH's of the remaining suspensions were not further adjusted. At the completion of each reaction, the insoluble residue was recovered and the saccharification efficiency computed by the methods described in Example 1. The results are reported in Table II, below.

EXAMPLE 3

Wheat straw (90 kg.), water (2270 l.), and $H_2O_2$ to make a 1% solution [68 l. of 35% (w/v) $H_2O_2$] were mixed together in a 3785-l. stainless steel vat equipped with a shaft-driven stirrer. About 32 l. of 50% (w/v) NaOH was added to adjust the slurry to pH 11.5. The mixture, initially at room temperature, was stirred overnight during which time the temperature attained a maximum of about 37° C. The slurry of treated straw was pumped into stainless steel screnning tanks for collection of solids and separation of the liquid fraction for recycle. Dewatering was conducted in a hydraulic press, and the presscake was broken into fragments and dried in a forced-air oven at 79° C. for 1–2 hr. About 45 kg. of dried, treated wheat straw was recovered from the run and ground in an Abbe mill to pass a 6-mm. screen. This process was repeated five times using the recycled filtrate made up with water, $H_2O_2$, and NaOH as necessary. The combined product of the six runs was characterized by a crude protein content of 0.48%, cellulose content of 72.8%, and hemicellulose content of 17.9%, all on a dry weight basis.

TABLE II

Effects of Treatment Conditions on Wheat Straw

| Example | $H_2O_2$ (% w/v) | pH control | Duration (hr.) | Insoluble residue (g./g. straw) | Insoluble hemicellulose (% of initial)[a] | Saccharification efficiency |
|---|---|---|---|---|---|---|
| 2A | 0 | + | 6 | 0.83 | 100 | 28 |
| 2B | 0 | + | 24 | 0.83 | 100 | 28 |
| 2C | 1 | − | 6 | 0.62 | 42 | 74 |
| 2D | 1 | − | 24 | 0.50 | 8 | 87 |
| 2E | 1 | + | 6 | 0.76 | 81 | 93 |

[a]Calculated from insoluble residue value, assuming 0.36 g. hemicellulose/g. straw initially and 0.35 g. cellulose, 0.07 g. lignin, and 0.05 g. ash remain after each treatment.

TABLE III

Wheat Straw-Amended Sheep Diet

| | Wheat straw MPF | | Untreated wheat straw | |
|---|---|---|---|---|
| | Low level (%) | High level (%) | Low level (%) | High level (%) |
| Ingredient | | | | |
| Corn grain | 46 | 3.5 | 46.4 | 3.6 |
| Wheat straw | 35.9 | 72.2 | 35.3 | 71.5 |
| Soybean meal | 11.7 | 18.0 | 11.8 | 18.5 |
| Cane molasses | 5.5 | 5.5 | 5.6 | 5.5 |
| Limestone | 0.7 | 0.2 | 0.7 | 0.2 |
| Dicalcium phosphate | — | 0.4 | — | 0.2 |
| Vitamins A, D, E, K | 0.2 | 0.2 | 0.2 | 0.4 |
| Composition | | | | |
| Dry matter, % | 85.6 | 89.3 | 84.2 | 86.7 |
| Crude protein, % | 9.8 | 9.6 | 13.7 | 14.2 |
| Cellulose, % | 33.8 | 62.5 | 22.5 | 35.2 |
| Hemicellulose, % | 11.6 | 7.0 | 15.0 | 15.8 |
| Gross energy, Kcal./g. | 4.26 | 4.20 | 4.34 | 4.35 |

Untreated wheat straw was ground in an Abbe mill to pass a 3-mm. screen. Treated MPF and untreated samples were each formulated into sheep diets at two levels as described in Table III, below. Six replicates of each diet were fed to test sheep at a controlled level of 15% below ad libitum intake. Results of the feeding trials are reported in Table IV.

EXAMPLE 4

Hemicellulose-depleted wheat straw MPF (Type I) was prepared as follows: wheat straw (90 kg.) was suspended in 2270 l. of water in a 3800-l. stainless steel tank equipped with a shaft-driven stirrer. Hydrogen peroxide (68 l. of 35% w/v) was added to the stirred suspension, and the pH was adjusted to 11.5 using NaOH [approximately 32 l. of 50% (w/v)]. The suspension was stirred for 18 hr. at room temperature. During the course of the reaction, the straw disintegrated into a thick suspension of small, highly water-absorbent fibers, and the suspension pH rose to 12.2, causing solubilization of the bulk of the straw hemicellulose. After neutralization of the suspension (using approximately 30 l. concentrated HCl, final pH=7), the straw fibers were washed and partially dewatered using a modified Fourdrinier moving wire filtration unit equipped with spray showers. The washed, treated straw was then dried at 70° C. in a forced-air oven for 8–12 hr.

EXAMPLE 5

Wheat straw MPF retaining most of its original hemicellulose content (Type II) was prepared as follows: wheat straw was ground in a hammer mill to pass a 1-cm. screen. Approximately 90 kg. of ground straw was added to 2270 l. water in a 3800-l. stainless steel tank equipped with a shaft-driven stirrer. Sixty-eight liters of 35% (w/v) hydrogen peroxide were added to the stirred slurry, after which the pH was immediately adjusted to 11.5 using approximately 32 l. of 50% (w/v) NaOH.

TABLE IV

Results of Wheat Straw Feeding Trials in Sheep

| | Wheat straw MPF | | Untreated wheat straw | | |
|---|---|---|---|---|---|
| Item | Low level | High level | Low level | High level | Standard error of the mean |
| Feed intake, g./d. | 984.9[a] | 769.2[c] | 863.4[b] | 433.6[d] | 14.2 |
| Apparent digestibility, % | | | | | |
| Dry matter | 72.2[a] | 67.4[a] | 53.4[b] | 48.5[b] | 2.5 |
| Crude protein | 59.2[bc] | 53.3[c] | 63.4[b] | 74.1[a] | 2.5 |
| Cellulose | 64.8[a] | 76.6[a] | 26.8[c] | 43.4[b] | 4.5 |
| Hemicellulose | 61.2[b] | 83.3[a] | 21.7[c] | 33.2[c] | 6.6 |
| Energy | 72.1[a] | 66.5[a] | 52.8[b] | 48.8[b] | 2.6 |
| Weight gain, g./d. | 241.2[a] | 234.8[a] | 202.3[a] | −105.7[b] | 23.00 |
| Ruminal pH | 7.1[a] | 7.1[a] | 6.2[c] | 6.7[b] | 0.05 |
| Ruminal ammonia, mg. % | 5.1[bc] | 3.7[c] | 5.7[b] | 22.3[a] | 0.79 |
| Ruminal volatile fatty acid concentrations, mM | | | | | |
| Total | 65.2[a] | 43.5[b] | 50.5[ab] | 43.0[b] | 6.00 |
| Acetate | 40.0 | 29.0 | 31.0 | 29.3 | 4.00 |
| Propionate | 16.5 | 11.0 | 14.3 | 9.3 | 2.20 |
| Butyrate | 8.7[a] | 3.5[b] | 5.2[b] | 4.3[b] | 0.70 |

[a, b, c, d] Mean values unlike superscripts are significantly different (P < 0.05).

The reaction pH was monitored every 30–60 min., and maintained at pH 11.5±0.2 by the addition of concentrated HCl as needed (total HCl=11 l.). After 5.5 hr., the reaction was terminated by lowering the pH to 7.0±0.5 with about 15 l. concentrated HCl. The treated straw slurry was then washed and partially dewatered using a modified Fourdrinier wire filtration unit equipped with four spray showers. The washed straw was then dried in a forced-air oven for at least 4 hr. at 70° C.

EXAMPLE 6

The ability of various cellulosic fibrous materials and bread flour to absorb water was determined by suspending 1 g. of the material in 100 ml. distilled, deionized water and mixing gently for 30 min. Excess water was then removed from the slurry by filtration through a very fine mesh screen, which retained >95% of the solid particles. Portions of the water-saturated materials were collected from the screen, weighed, oven dried (110° C.) to constant weight, and then reweighed. Water absorbency was determined by dividing the difference between the sample wet and dry weights by the sample dry weight.

Swollen volume of the tested materials was determined by suspending 1 g. of the material to be tested in 100 ml. of distilled, deionized water in a graduated cylinder. After allowing the sample to equilibrate for 30 min. with gentle mixing, the material was allowed to settle to the bottom of the cylinder. When settling was complete (usually within 1 hr.), the volume occupied by the water-saturated material was recorded. The results are reported in Table V, below.

TABLE V

Physical Properties of Dietary Fibers

| Material | Bulk density (g./100 cc.) | $H_2O$ absorbency (g. $H_2O$/g.) | Swollen volume (ml./g.) |
|---|---|---|---|
| All-Purpose wheat flour[a] | 55.9 | 1.64 | 4.0 |
| Alphacellulose, crude[b] | 10.2 | 5.3 | 7.9 |
| Alphacellulose, purified[c] | 24.7 | 3.8 | 5.0 |
| Microcrystalline cellulose[d] | 36.5 | 1.74 | 4.3 |
| Wheat straw MPF: | | | |
| Type I, pin milled[e] | 7.2 | 14.0 | 39.5 |
| Type I, 1 mm.[f] | 12.2 | 14.0 | 22.0 |
| Type I, never dried | — | 21.9 | 76.0 |
| Type II, 1 mm.[f] | 24.0 | 10.3 | 16.5 |
| Corn stover MPF: | | | |
| Type I, pin milled[e] | 12.8 | 10.3 | 15.0 |
| Type I, 1 mm.[f] | 16.2 | 11.9 | 16.0 |

[a] "Pillsbury's Best" bread flour.
[b] "Solka-floc BW-40."
[c] "Alphacel;" lower levels of lignin and hemicellulose than crude alphacellulose.
[d] "Avicel."
[e] Ground in a pin mill at 14,000 r.p.m.
[f] Ground in a Wiley mill to pass a 1 mm. screen.

EXAMPLE 7

The effects of replacing 10% by weight of flour with various cellulosic fibrous materials on the rheological properties of flour-based doughs was measured in a mixograph (National Manufacturing Co., Lincoln, Nebr.). Dry samples of wheat flour ("Pillsbury's Best" bread flour) and cellulosic fibrous material were carefully weighed and mixed as necessary before being placed in the mixograph bowl (total sample dry weight=10 g.). A hole was created in the center of the flour-based mixture in the mixograph bowl, and a carefully measured quantity of water was added. The mixograph was then operated for 15–25 min., and the degree of deflection of the mixograph arm was recorded on a strip chart recorder. The point of maximum deflection (peak) corresponds to the point of optimal dough properties. The mixograph peak heights are reported in Table VI, below.

EXAMPLE 8

The effects of replacing various levels of flour with corn stalk MPF on the rheological properties of flour-based doughs were measured in a mixograph (National Manufacturing Co., Lincoln, Nebr.). The mixing and measurement were conducted by the same procedures outlined in Example 7. The mixograph peak heights and mixing time to peak height are reported in Tables VII and VIII, respectively.

EXAMPLE 9

Eight-day-old New Hampshire X Columbian chicks were allotted in a completely randomized design to three pens of five chicks for each diet tested. Chicks were housed in electrically heated brooders (33° C.) placed in a temperature-controlled room (23° C.) and fed the test diet and water ad libitum. The composition of the diets is listed in Table IX. Fiber sources tested [alphacellulose (crude), alphacellulose (purified), and wheat straw MPH, Types I and II] were substituted for 0–30% of the corn starch in the diet.

TABLE VI

Effect of Cellulosic Fibrous Materials on Dough Properties of Bread Flour--Mixograph Peak Height

| Fibrous material (replacing 10% of flour on dry weight basis) | Mixograph peak height[a] Grams $H_2O$ Added to 10 g. flour | | |
|---|---|---|---|
| | 6.1[2] | 6.6 | 7.1 |
| None | 467 | 430 | 403 |
| Alphacellulose (crude)[c] | 405 | 380 | 350 |
| Alphacellulose (purified)[d] | 410 | 400 | 370 |
| Corn stalk MPF (Type I, pin milled)[e] | 530 | 520 | 510 |
| Corn stalk MPF (Type I, ball milled)[f] | 515 | 480 | 470 |
| Wheat straw MPF (Type I, pin milled)[e] | 565 | 520 | 480 |
| Wheat straw MPF (Type I, ball milled)[f] | 480 | 450 | 420 |
| Wheat straw MPF (Type I, never dried) | 570 | 540 | 470 |
| Switchgrass MPF (Type I, pin milled)[e] | 520 | 470 | 435 |

[a]Full scale = 1000.
[b]"Pillsbury's Best" bread flour at 14% moisture.
[c]"Solka-floc BW-40."
[d]"Alphacel;" lower levels of lignin and hemicellulose than crude alphacellulose.
[e]Ground in a pin mill at 14,000 r.p.m.
[f]Ground for 7 hr. in a ball mill.

TABLE VII

Effect of Various Levels of Corn Stalk MPF on Dough Properties of Bread Flour--Mixograph Peak Height

| Level of Type I corn stalk MPF (replacing flour on dry weight % basis) | Mixograph peak height[a] Grams $H_2O$ added to 10 g. flour[b] | | | |
|---|---|---|---|---|
| | 7.1 | 8.1 | 9.1 | 10.1 |
| 0 | 403 | 350 | c | c |
| 2 | 420 | 380 | d | d |
| 5 | 450 | 440 | d | d |
| 10 | 510 | 450 | 410 | 370 |
| 20 | 550 | 475 | 430 | 420 |

[a]Full scale = 1000.
[b]"Pillsbury's Best" bread flour at 14% moisture.
[c]Unacceptable dough.
[d]Not tested.

TABLE VIII

Effect of Various Levels of Corn Stalk MPF on Dough Properties of Bread Flour--Time to Mixograph Peak Height

| Level of Type I corn stalk MPF (replacing flour on volume % basis) | Time to mixograph peak (min.) Grams $H_2O$ added to 10 g. flour[a]/MPF mixture | | |
|---|---|---|---|
| | 6.1 | 7.1 | 8.1 |
| 0 | 5.0 | 8.5 | 17.0 |
| 2 | 6.0 | 9.0 | 15.5 |
| 5 | 6.0 | 8.0 | 12.5 |
| 10 | 6.3 | 7.5 | 10.5 |

[a]"Pillsbury's Best" bread flour at 14% moisture.

TABLE IX

Composition of Basal Diet Fed to Chicks

| Diet constituent | Weight % |
|---|---|
| Corn starch:dextrose (2:1) | 61.4 |
| Casein | 23.4 |
| dl-Methionine | 0.35 |
| Arginine | 1.5 |
| Glycine | 1.0 |
| Corn oil | 5.0 |
| Mineral mix[a] | 5.4 |
| Vitamin mix[b] | 0.2 |
| Choline Chloride | 0.2 |
| Ethoxyquin | 125 mg./kg. |
| Sodium bicarbonate | 1.5 |

[a]Composed of each of the following (weight percent of total diet: $CaCO_3$, 0.3; $Ca_3(PO_4)_2$, 2.8; $K_2HPO_4$, 0.9; NaCl, 0.9; $MgSO_4.7H_2O$, 0.4; $MnSO_4H_2O$, 0.7; Fe citrate, 0.05; $ZnCO_3$, 0.01; $CuSO_4.5H_2O$, 0.002; $H_3BO_3$, 0.009; $Na_2MoO_4.2H_2O$, 0.0009; KI, 0.004; $CoSO_4.7H_2O$, 0.0001; $Na_2SeO_3$, 0.00002.
[b]Composed of each of the following mg./kg. total diet): vitamin A palmitate (250,000 IU/g., 40.0); cholecalciferol (400,000 IU/g., 1.5); dl-alpha-tocopherol acid acid succinate, 20.0; menadione, 5.0; riboflavin, 16.0; calcium pantothenate, 20.0; niacin, 100.0; vitamin B-12 triturate, 0.02; folic acid, 4.0; biotin, 0.6; ascorbic acid, 250.0; pyridoxine.HCl, 6.0; thiamine.HCl, 100.00; powdered starch, 1334.9.

Chicks were fed the test diets for 14 days, during which the amount of feed eaten and the gain in live weight for each pen were recorded. Wheat straw MPF was prepared as described in Examples 4 and 5. The results are reported in Table X, below.

EXAMPLE 10

Weanling, male Sprague-Dawley rats weighing 50±5 g. were housed individually in wire-mesh floored cages equipped to allow complete collection of feces and urine. The cages were maintained in a room with constant temperature (23° C.), humidity, and light cycle. Prior to initiation of the experiment, rats were fed a standard commercial laboratory diet. The experimental period consisted of a 14-day adaptation phase followed by a 5-day digestion/metabolism experiment. Each diet tested was fed to seven rats. Rats were offered 15 g./day of their respective test diet for the first 7 days of the adaptation phase, and 20 g./day for the remaining 7 days. At the end of this phase, the quantity of feed offered per day to all rats was reduced to 90% of the ad libitum intake of the test group having the lowest average consumption for the last 2 days of the adaptation phase. After allowing 2 days for adjustment to the reduced level of intake, the intake and digestibility of each test diet was measured for 5 days. Total diet dry matter digestibility was determined from the amount of dry matter eaten and excreted by each animal group.

The test diets were comprised of a basal diet (Table XI) in which 0–30% of the corn starch:dextrose had been replaced by wheat straw MPF (Type II). The wheat straw MPF was prepared by suspending straw (4–6 g./.1) in a solution of hydrogen peroxide (1% w/v) adjusted to pH 11.5 with NaOH. The suspension was mixed gently for 6 hr., during which the pH was maintained at 11.5±0.2 by addition of NaOH or HCl as necessary.

TABLE X
Weight Gain Efficiency in Chicks Fed Fiber-Amended Diets

| Dietary replacement | Weight gain efficiency (%)[1] Level of replacement (wt. %) | | | |
|---|---|---|---|---|
| for corn starch: dextrose | 0 | 10 | 20 | 30 |
| Alphacellulose (crude)[2] | 79[a] | 74[abc] | 66[de] | 55[g] |
| Alphacellulose (purified)[3] | 79[a] | 74[abc] | 70[cd] | 59[fg] |
| Wheat straw MPF (Type I) | 79[a] | 77[a] | 68[de] | 60[fg] |
| Wheat straw MPF (Type II) | 79[a] | 76[ab] | 71[bcd] | 63[ef] |

[1]Weight gain efficiency = (g. live weight gain/g. feed intake) × 100.
[2]"Solka-floc."
[3]"Alphacel;" lower levels of lignin and hemicellulose than crude alphacellulose.
[a, b, c, d, e, f, g]Mean values with unlike superscripts are significantly different (P < 0.05).

TABLE XI
Composition of Basal Diet Fed to Rats

| Diet constituent | Weight % |
|---|---|
| Corn starch:dextrose (2:1) | 73.0 |
| Casein | 15.1 |
| dl-Methionine | 0.2 |
| Corn oil | 6.0 |
| Mineral mix[a] | 5.37 |
| Vitamin mix[b] | 0.2 |
| Choline chloride | 0.1 |
| MgSO4 | 0.03 |

[a]Composed of each of the following (weight percent of total diet): CaCO3, 0.3; Ca3(PO4)2, 2.8; K2HPO4, 0.9; NaCl, 0.9; MgSO4.7H2O, 0.4; MnSO4.H2O, 0.7; Fe citrate, 0.05; ZnCO3, 0.01; CuSO4.5H2O, 0.002; H3BO3, 0.0009; Na2MoO4.2H2O, 0.0009; KI, 0.004; CoSO4.7H2O, 0.0001; Na2SeO3, 0.00002.
[b]Composed of each of the following mg./kg. total diet): vitamin A palmitate (250,000 IU/g., 40.0); cholecalciferol (400,000 IU/g., 1.5); dl-alpha-tocopherol acid succinate, 20.0; menadione, 5.0; riboflavin, 16.0; calcium pantothenate, 20.0; niacin, 100.0; vitamin B-12 triturate, 0.02; folic acid, 4.0; biotin, 0.6; ascorbic acid, 250.0; pyridoxine.HCl, 6.0; thiamine.HCl, 100.00; powdered starch, 1334.9.

The treated straw was collected by filtration, washed with distilled water, dried at 90° C. is a forced-air oven for 24 hr., and then ground to pass a 1-mm. screen.

The results of the digestibility assay are reported in Table XII.

EXAMPLE 1

Shortbread was prepared as follows: one-fourth cup (59 ml.) sugar was blended with ¾ cup (177 ml.) butter. Then 1.6 cup (379 ml.) all-purpose wheat flour and 0.4 cup (94.7 ml.) wheat straw MPF ground through a Wiley mill to 0.5-m. particles were blended into the previous mixture. The resulting dough was rolled on a floured board to 1-cm. thickness and cut into squares. The dough was baked at 177° C. for 20 min. to produce a shortbread having acceptable mouthfeel and flavor.

EXAMPLE 12

The same formulation was prepared a above, using 1 cup (237 ml.) all-purpose wheat flour and 1 cup (237 ml) wheat straw MPF. The resulting shortbread was indistinguishable in flavor from that of Example 11.

EXAMPLE 13

Pancakes were prepared in the following manner: 1 egg was beaten in a Waring blender. One cup (237 ml. buttermilk, 2 tablespoons (30 ml.) salad oil, 1 tablespoon (15 ml) sugar, 1 teaspoon (5 ml.) baking powder, ½ teaspoon (2.5 ml.) soda, and 1/2 teaspoon (2.5 ml.) salt were added to the blended and mixed. To this mixture, 1 cup (237 ml.) all-purpose wheat flour weighing 133 g. was added and mixed. When measured volumes of the resulting batter were cooked on a hot griddle, a stack of pancakes 7 mm. high, with a total weight of 329 g. was obtained.

A second batch of pancakes was prepared as above except that ½ cup (118 ml.) of pin-milled wheat straw MPF was substituted for ½ cup (118 ml.) of the wheat flour.

TABLE XII
Digestibility of Diets Containing Wheat Straw MPF (Type II) in Rats

| Amount of corn starch: dextrose replaced with wheat straw MPF (wt. %) | Intake level, g./d. | Dry matter digestibility (%) |
|---|---|---|
| 0 | 8.65 | 96.2 |
| 10 | 9.67 | 86.4 |
| 20 | 9.45 | 78.4 |
| 30 | 10.02 | 69.5 |

The resulting flour-MPF mixture weighed 75.0 g. and yielded a stack of pancakes 67 mm. high with a total weight of 321 g. These pancakes were light and fluffy and indistinguishable in texture and flavor from the all-flour pancakes in the first batch.

A third batch of pancakes was prepared as above except that 1 cup (237 ml.) of pin-milled wheat straw MPF was substituted for ½ cup (118 ml.) of the wheat flour. The resulting flour-MPF mixture weighed 83.9 g. and yielded a stack of pancakes 89 mm. high with a total weight of 315 g. These pancakes were light and fluffy and indistinguishable in texture and flavor from the all-flour pancakes in the first batch.

EXAMPLE 14

An oatmeal spice cake was prepared as follows: one cup (237 ml.) all-purpose wheat flour, ½ cup (118 ml.) wheat straw MPF (0.5-mm. particle size), 1 cup (237 ml.) quick-cooking oats, 1 cup (237 ml.) brown sugar, ½ cup (118 ml.) granulated sugar, 1½ teaspoon (7.5 ml.) soda, 1 teaspoon (5 ml.) cinnamon, ½ teaspoon (2.5 ml.) salt, ½ teaspoon (2.5 ml.) nutmeg, ½ cup (118 ml.) shortening, 1 cup (237 ml.) water, 2 eggs, and 2 tablespoons (30 ml.) dark molasses were added to a mixing bowl, and blended with a mixer on low speed for ½ min. The mixture was then beaten at high speed for 3 min., after which the batter was baked in an oven at 177° C. for 35 min. The resulting cake was light, with an excellent texture and flavor.

EXAMPLE 15

Yeast rolls were prepared in the following manner: 2 cups (473 ml.) boiling water was poured over 1 cup (237 ml.) shortening, and 1 cup (237 ml.) of sugar in a large bowl. This mixture was then allowed to cool. Two cakes of yeast were softened in 4 tablespoons (60 ml.) of warm water, and were then added to the cooled mixture. Four cups (948 ml.) all-purpose wheat flour were then added to the ten eggs were then and blended by hand. To the resultant dough, 1¾ cups (414 ml.) wheat straw MPF (0.5-mm. particle size) and 2¼ cups (532 ml.) of additional wheat flour were added and mixed by hand. The dough was turned out onto a floured board and kneaded. It was then placed in a greased bowl, covered, and allowed to rise for 2 hr. The dough was then refrigerated for 10 hr. After refrigeration, the dough was rolled out to a thickness of 0.5 cm. on a floured board, buttered, and cut into triangles. The triangles were folded into rolls which were baked in an oven for 10 min. at 200° C. The dough rose normally, and the resulting rolls were characterized by an excellent flavor.

EXAMPLE 16

Sweet muffins were prepared as follows: ½ cup (118 ml.) milk and ¼ cup (59 ml.) oil were added to 1 beaten egg. One-half cup (118 ml.) sugar, 2 teaspoons (30 ml.) baking powder, and ½ teaspoon (2.5 ml.) salt were added to the mixture, and mixed with an electric mixer. All-purpose wheat flour (0.9 cup, 213 ml.) and 0.6 cup (142 ml.) of wheat straw MPF (0.5-mm. particle size), were mixed into the batter. The muffins were baked in an oven for 25 min. at 200o C., and were characterized by a very pleasing flavor and texture.

EXAMPLE 17

Cake donuts were prepared in the following manner: a mixture was made consisting of 1.65 cups (390 ml.) all-purpose wheat flour, and 1.65 cups (390 ml.) wheat straw MPF (0.5-mm. particle size). One and one-half cups (355 ml.) of this mixture was added to a mixing bowl, along with 1 cup (237 ml.) sugar, 3 teaspoons (45 ml.) baking powder, ½ teaspoon (2.5 ml.) salt, ½ teaspoon (2.5 ml.) cinnamon, ¼ teaspoon (1.3 ml.) nutmeg, 2 tablespoons (30 ml.) shortening, 2 eggs, and ¾ cup (177 ml.) milk. The above ingredients were mixed with an electric mixer on low speed for ½ min. and on medium speed for 2 min., during which the remaining flour MPF mixture was added. The dough was rolled in a buttered bowl, and was turned out onto a floured board and cut into donuts 1-cm. thick. These donuts were then deep fried. The donuts were characterized by normal texture and were pleasing in flavor. They were indistinguishable from normal wheat flour donuts.

EXAMPLE 18

White bread was made using the following method: 2 cups (473 ml.) all-purpose wheat flour, 1 cup (237 ml.) corn stalk MPF (pin milled), 3 tablespoons (45 ml.) of soft butter, 2 tablespoons (30 ml.) sugar, and 1 teaspoon (5 ml.) salt were blended for 5 sec. in a food processor. One package dry active yeast, which had been incubated in ¼ cup (59 ml.) warm water, and 1 egg together with 178 cup (118 ml.) to 182 cup (177 ml.) lukewarm water were then added to the food processor and blended until the dough formed a ball. The dough was removed to a greased pan, where it was allowed to rise for 1½ hr. After being punched down, and allowed to rise again for 15 min., the dough was shaped, and allowed to rise in a bread pan for 1 hr. The dough was baked in an oven at 190° C. for 40 min. The resultant loaf was characterized by acceptable texture and flavor, and was indistinguishable from a similar loaf in which no corn stalk MPF was substituted for the wheat flour.

It is understood that the foregoing detailed description is given merely by way of illustration and that modification and variations may be made therein without departing from the spirit and scope of the invention.

We claim:

1. A formulated food composition comprising (1) a food substance; and (2) modified plant fiber prepared by delignification of a nonwoody, lignocellulosic substrate by treatment with alkaline peroxide within the pH range of about 11.2 to about 11.8 for a sufficient period of time to yield a product characterized by the property of increasing the mixograph peak height of a mixture consisting of 10 g. wheat flour at 14% moisture and 6.1 g. water when 10% of said wheat flour is replaced with said modified plant fiber.

2. A formulated food composition as described in claim 1 wherein said food substance is a dough flour.

3. A formulated food composition as described in claim 1 wherein said food substance is a batter flour.

4. A formulated food composition as described in claim 1 wherein said food substance is a dispersible solid.

5. A formulated food composition as described in claim 1 wherein said food substance is an aqueous liquid.

6. A formulated food composition as described in claim 1 wherein said food substance is a gel or gel former.

7. A formulated food composition as described in claim 1 wherein said food substance is a human food.

8. A formulated food composition as described in claim 1 wherein said food substance is a monogastric animal feed.

9. A formulated food composition as described in claim 1 wherein said food substance is a ruminant feed.

10. In a dough flour or a batter flour, the improvement comprising from about 2% to about 65% by volume of a modified plant fiber prepared by delignification of a nonwoody, lignocellulosic substrate by treatment with alkaline peroxide within the pH range of about 11.2 to about 11.8 for a sufficient period of time to yield a product which is characterized by the property of increasing the mixograph peak height of a mixture consisting to 10 g. wheat flour at 14% moisture and 6.1 g. water when 10% of said wheat flour is replaced with said modified plant fiber.

11. A bread flour as described in claim 10.

12. A cake flour as described in claim 10.

13. A pancake flour as described in claim 10.

14. A formulated food composition comprising the flour of claim 10.

15. In an ingestible formulation, the improvement comprising from about 0.1% to about 95% of a modified plant fiber prepared by delignification of a nonwoody, lignocellulosic substrate by treatment with alkaline peroxide within the pH range of about 11.2 to about 11.8 for a sufficient period of time to yield a product characterized by the property of increasing the mixograph peak height of a mixture consisting of 10 g. wheat flour at 14% moisture and 6.1 g. water when 10% of said wheat flour is replaced with said modified plant fiber.

16. A formulated food composition comprising: (1) a food substance; and (2) a modified plant fiber prepared by an alkaline peroxide treatment of a nonwoody, lignocellulsic substrate at an initial pH in the range of about 11.2 to about 11.8 and characterized by only partial delignification and a significant increase in water absorbency as compared to the original substrate.

17. A formulated food composition as described in claim 10 wherein said food substance is a dough flour.

18. A formulated food composition as described in claim 16 wherein said food substance is a batter flour.

19. A formulated food composition as described in claim 16 wherein said food substance is a dispersible solid.

20. A formulated food composition as described in claim 16 wherein said food substance is an aqueous liquid.

21. A formulated food composition as described in claim 16 wherein said food substance is a gel or gel former.

22. A formulated food composition as described in claim 16 wherein said food substance is a human food.

23. A formulated food composition as described in claim 16 wherein said food substance is a monogastric animal feed.

24. A formulated food composition as described in claim 16 wherein said food substance is a ruminant feed.

25. In a dough flour or a batter flour, the improvement comprising from about 2% to about 65% by volume of a modified plant fiber prepared by an alkaline peroxide treatment of a nonwoody, lignocellulosic substrate at an initial pH in the range of about 11.2 to about 11.8 and characterized by only partial delignification and a significant increase in water absorbency as compared to the original substrate.

26. A bread flour as described in claim 25.

27. A cake flour as described in claim 25.

28. A pancake flour as described in claim 25.

29. A formulated food composition comprising the flour of claim 25.

30. In an ingestible formulation, the improvement comprising from about 0.1% to about 95% of a modified plant fiber prepared by an alkaline peroxide treatment of a nonwoody, lignocellulosic substrate at an initial pH in the range of about 11.2 to about 11.8 and characterized by only partial delignification and a significant increase in water absorbency as compared to the original substrate.

* * * * *